United States Patent
Glen

(10) Patent No.: US 9,628,740 B2
(45) Date of Patent: Apr. 18, 2017

(54) METHOD, APPARATUS AND MACHINE-READABLE MEDIUM FOR DESCRIBING VIDEO PROCESSING

(71) Applicant: ATI Technologies ULC, Markham (CA)

(72) Inventor: David Glen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 18 days.

(21) Appl. No.: 14/104,419

(22) Filed: Dec. 12, 2013

(65) Prior Publication Data

US 2014/0098295 A1    Apr. 10, 2014

Related U.S. Application Data

(62) Division of application No. 12/339,625, filed on Dec. 19, 2008.

(Continued)

(51) Int. Cl.
*H04N 7/01* (2006.01)
*H04N 9/82* (2006.01)
(Continued)

(52) U.S. Cl.
CPC .............. *H04N 5/44* (2013.01); *H04N 5/775* (2013.01); *H04N 7/083* (2013.01); *H04N 7/088* (2013.01);
(Continued)

(58) Field of Classification Search
USPC ........................................................ 348/575
See application file for complete search history.

(56) References Cited

U.S. PATENT DOCUMENTS 5,872,565 A    2/1999   Greaves et al.
6,215,485 B1 *  4/2001   Phillips ......................... 345/698
(Continued)

FOREIGN PATENT DOCUMENTS

CN    200480003238       3/2006
EP    1688881 A2         8/2006
(Continued)

OTHER PUBLICATIONS

Chinese Office Action; Chinese Application No. 200880127204.4; office action dated Feb. 21, 2014.
(Continued)

*Primary Examiner* — Michael Teitelbaum
(74) *Attorney, Agent, or Firm* — Faegre Baker Daniels LLP

(57) ABSTRACT

An upstream video processor may perform video processing upon video data to created processed video data. The video processing may include at least one of color correction, contrast correction, gamma correction, sharpness enhancement, and edge enhancement. Metadata indicative of the performed video processing may also be generated. The processed video data and metadata may be passed to a downstream video processor, the latter for use in determining what further video processing, if any, to apply. An intermediate video processor may receive video data and metadata indicating video processing performed thereupon by an upstream video processor. Based on the received metadata, additional video processing may be performed, and new metadata indicating the additional video processing may be generated. Composite metadata may be generated from the received and new metadata and may be passed along with the processed video data to a downstream video processor for use in determining what further video processing, if any, to apply.

11 Claims, 12 Drawing Sheets

Related U.S. Application Data

(60) Provisional application No. 61/015,313, filed on Dec. 20, 2007.

(51) Int. Cl.

| | | |
|---|---|---|
| *H04N 21/43* | (2011.01) | |
| *H04N 5/44* | (2011.01) | |
| *H04N 5/77* | (2006.01) | |
| *H04N 7/08* | (2006.01) | |
| *H04N 19/61* | (2014.01) | |
| *H04N 21/84* | (2011.01) | |
| *H04N 5/57* | (2006.01) | |
| *H04N 5/78* | (2006.01) | |
| *H04N 5/775* | (2006.01) | |
| *H04N 7/083* | (2006.01) | |
| *H04N 7/088* | (2006.01) | |
| *H04N 21/435* | (2011.01) | |
| *H04N 21/436* | (2011.01) | |
| *H04N 21/44* | (2011.01) | |
| *H04N 5/781* | (2006.01) | |
| *H04N 5/85* | (2006.01) | |
| *H04N 21/431* | (2011.01) | |

(52) U.S. Cl.
CPC ........... *H04N 19/61* (2014.11); *H04N 21/435* (2013.01); *H04N 21/436* (2013.01); *H04N 21/44* (2013.01); *H04N 21/84* (2013.01); H04N 5/57 (2013.01); H04N 5/781 (2013.01); H04N 5/85 (2013.01); H04N 7/012 (2013.01); H04N 7/014 (2013.01); H04N 7/0127 (2013.01); H04N 7/0147 (2013.01); H04N 9/8205 (2013.01); H04N 21/4318 (2013.01)

(56) References Cited

U.S. PATENT DOCUMENTS

| | | | |
|---|---|---|---|
| 7,542,618 B2 | 6/2009 | Kang et al. | |
| 2002/0120925 A1* | 8/2002 | Logan | 725/9 |
| 2004/0263529 A1 | 12/2004 | Okada et al. | |
| 2005/0024384 A1 | 2/2005 | Evans et al. | |
| 2007/0074265 A1 | 3/2007 | Bennett et al. | |
| 2007/0223889 A1 | 9/2007 | Dandekar et al. | |
| 2007/0268411 A1* | 11/2007 | Rehm et al. | 348/650 |
| 2007/0277245 A1* | 11/2007 | Goto et al. | 726/27 |

FOREIGN PATENT DOCUMENTS

| | | | |
|---|---|---|---|
| JP | 2004007271 A | 1/2004 | |
| JP | 2004-112695 A | 4/2004 | |
| JP | 2005-285089 A | 10/2005 | |
| JP | 2006-074533 A | 3/2006 | |
| JP | 2006-222958 | 8/2006 | |
| JP | 2007-080071 A | 3/2007 | |
| JP | 2007-082060 A | 3/2007 | |
| JP | 2007257634 A | 10/2007 | |
| WO | WO2006039357 * | 4/2006 | G11B 27/031 |

OTHER PUBLICATIONS

Japanese Decision of Refusal; Japanese Application No. 2010-538296; dated Apr. 2, 2014.

International Search Report from Canadian Patent Office; for International Application No. PCT/CA2008/002207; dated Apr. 14, 2009.

HDMI Transport Specification; TXH Blackbird; Mar. 9, 2006; pp. 1-31.

Content Descriptor Definitions; TXH Blackbird; Mar. 9, 2005; pp. 1-46.

Japanese Final Office Action; Japanese Application No. 2010-538296; dated Aug. 7, 2013.

Extended EP Search Report; EP Application No. 08864372.1; dated Dec. 20, 2012.

Japanese Office Action; Japanese Application No. 2010-538296; dated Sep. 5, 2012.

Chinese Office Action; Chinese Application No. 200880127204.4; office action dated Oct. 22, 2012.

Korean Office Action; Korean Intellectual Property Office; Korean Patent Application No. 10-2010-7016296; dated Nov. 25, 2014.

Japanese Patent Office, "Notification of Reason(s) for Refusal", mailed Oct. 6, 2015, in Japanese Patent Application No. 2014-157806.

EP Patent Office Communication; EP patent application No. 08864372.1; mailed May 15, 2015.

* cited by examiner

METHOD, APPARATUS AND MACHINE-READABLE MEDIUM FOR DESCRIBING VIDEO PROCESSING

CROSS-REFERENCE TO RELATED APPLICATIONS

The present application is a divisional of U.S. patent application Ser. No. 12/339,625, filed Dec. 19, 2008, which is hereby incorporated herein by reference in its entirety, which claims the benefit of U.S. Provisional Application No. 61/015,313 filed on Dec. 20, 2007.

FIELD OF TECHNOLOGY

The present disclosure relates generally to video processing, and more particularly to a method and apparatus for describing video processing.

BACKGROUND

Moving picture video is typically recorded or encoded at a pre-determined frame rate. For example, cinema films are typically recorded at a fixed rate of 24 frames per second (fps). Video as broadcast for television in accordance with the NTSC standard, on the other hand, is encoded at 30 fps. Video broadcast in accordance with European PAL or SECAM standards is encoded at 25 fps.

Conversion between frame rates has created challenges. One common technique of converting frame rates involves dropping or repeating frames within a frame sequence. For example, telecine conversion (often referred to as 3:2 pull down) is used to convert 24 fps motion picture video to 60 fields per second (30 fps). Each second frame spans 3 video fields, while each other second frame spans two fields. Telecine conversion is, for example, detailed in Charles Poynton, Digital Video and HDTV Algorithms and Interfaces, (San Francisco: Morgan Kaufmann Publishers, 2003), the contents of which are hereby incorporated by reference.

Various other techniques for frame rate conversion are discussed in John Watkinson "The Engineer's Guide to Standards Conversion", Snell and Wilcox Handbook Series.

More recently, frame rate conversion has not only been used for conversion between formats and standards, but also to enhance overall video quality. For example, in an effort to reduce perceptible flicker associate with conventional PAL televisions, high frame rate 100 fields per second (50 fps) televisions have become available.

In the future, higher frame rates may become a significant component in providing higher quality home video. Existing video, however, is not readily available at the higher frame rate. Accordingly, frame rate conversion will be necessary. Such conversion, in real time presents numerous challenges, arising at least in part from the requirements to analyse incoming video in order to form higher rate video. This is exacerbated in current video receivers in which frame rate conversion and other video processing function independently.

Video processors, such as those found within video player devices (e.g. PCs, DVD-Video players, High-Density HD-DVD players, Blu-Ray disc players, or set-top boxes), may apply various types of video processing to a video signal to improve the appearance or quality of the video image. For example, a video processor may apply color correction, gamma correction, contrast correction, sharpness enhancement or edge enhancement, or combinations of these. The video processing that is applied may be based wholly or partly upon user preferences. Once the video signal has been processed, it may be passed to a downstream component, such as a display device (e.g. a flat panel display such as a Liquid Crystal Display (LCD) or plasma display or a rear-projection display such as a Digital Light Processing (DLP) or Liquid Crystal on Silicon (LCoS) display). The downstream component may have a video processor that is capable of performing some or all of the same video processing that the upstream video processor is capable of performing, possibly in addition to further video processing of which the upstream video processor is incapable. However, in view of the independent functioning of the upstream and downstream video processors, the downstream video processor may have difficulty ascertaining what further video processing, if any, it should perform.

A solution which obviates or mitigates at least one of the above-noted shortcomings would be desirable.

SUMMARY

In one aspect, there is provided a method comprising, at a video processor: performing video processing upon video data, the video processing resulting in processed video data; and passing the processed video data and generated metadata indicative of the performed video processing to a downstream video processor.

In another aspect, there is provided a method comprising, at a video processor: receiving video data; receiving metadata indicative of video processing that has been performed upon the video data by an upstream video processor; and based on the metadata, determining further video processing to apply, if any, to the video data.

In another aspect, there is provided a method comprising, at an intermediate video processor: receiving video data; receiving metadata indicative of video processing that has been earlier performed upon the video data by an upstream video processor; based on the received metadata, performing additional video processing upon the video data to create processed video data; and passing the processed video data and composite metadata, which is based on the received metadata and new metadata indicative of the performed additional processing, to a downstream video processor.

In another aspect, there is provided a machine-readable medium storing instructions that, when executed by a processor, cause the processor to: perform video processing upon video data, the video processing resulting in processed video data; and pass the processed video data and generated metadata indicative of the performed video processing to a downstream video processor.

In another aspect, there is provided a machine-readable medium storing instructions that, when executed by a processor, cause the processor to: receive video data; receive metadata indicative of video processing that has been performed upon the video data by an upstream video processor; and based on the metadata, determine further video processing to apply, if any, to the video data.

In another aspect, there is provided a machine-readable medium storing instructions that, when executed by a processor, cause the processor to: receive video data; receive metadata indicative of video processing that has been earlier performed upon the video data by an upstream video processor; based on the received metadata, perform additional video processing upon the video data to create processed video data; and pass the processed video data and composite metadata, which is based on the received metadata and new metadata indicative of the performed additional processing, to a downstream video processor.

In another aspect, there is provided a video processor comprising: at least one functional block for performing video processing upon video data, the video processing resulting in processed video data; and a metadata formatter for generating metadata indicative of the performed video processing for passing to a downstream video processor along with the processed video data.

In another aspect, there is provided a video processor comprising: a buffer for receiving video data; a metadata decoder for decoding received metadata indicative of video processing that has been performed upon the video data by an upstream video processor; and at least one functional block for performing further video processing upon the video data, the further video processing being determined at least in part based on the metadata.

In another aspect, there is provided an intermediate video processor comprising: a buffer for receiving video data; a metadata decoder for decoding received metadata indicative of video processing that has been earlier performed upon the video data by an upstream video processor; at least one functional block for performing additional video processing upon the video data, the additional video processing being determined based on the metadata and resulting in processed video data; and a metadata formatter for generating composite metadata for passing to a downstream video processor along with the processed video data, the composite metadata being based on the received metadata and new metadata indicative of the performed additional video processing.

Other aspects and features of the present disclosure will become apparent to those of ordinary skill in the art upon review of the following description of specific embodiments in conjunction with the accompanying figures.

BRIEF DESCRIPTION OF THE DRAWINGS

In the figures which illustrate by way of example only, embodiments of the present invention.

DETAILED DESCRIPTION

Figure 1:
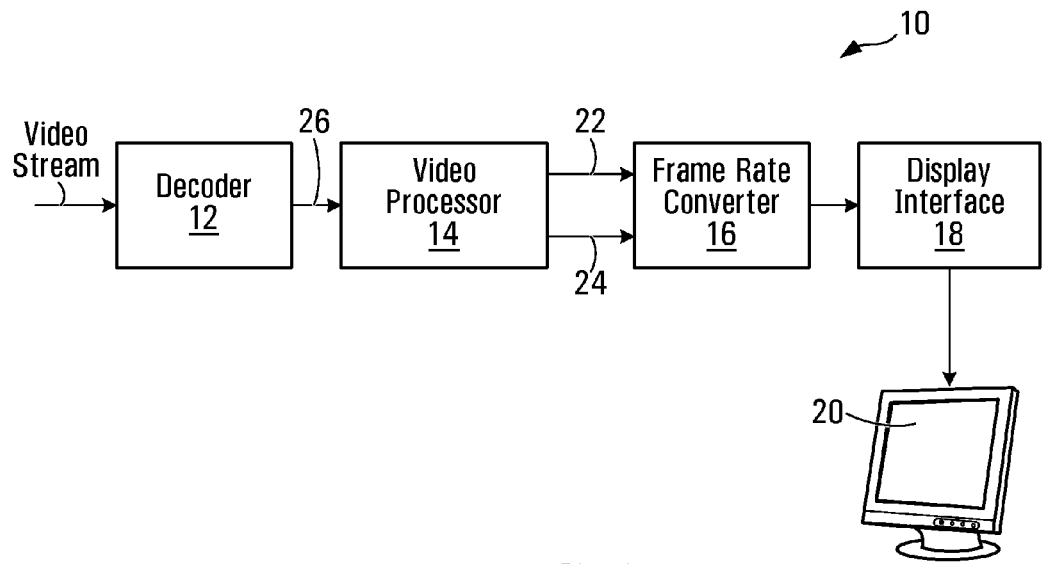
FIG. 1 is a simplified schematic block diagram of an exemplary video receiver.

FIG. 1 is a schematic block diagram of an exemplary video receiver 10. As illustrated video receiver 10 includes a video decoder 12, a video processor 14, a frame rate converter (FRC) 16, and a display interface 18. Video receiver 10 may take the form of a set top box, satellite receiver, terrestrial broadcast receiver, media player (e.g. DVD-Video player), media receiver, or the like. Receiver 10 (or portions thereof) may optionally be integrated in a display device, such as a flat panel television, computer monitor, portable television, hand-held device (such as a personal digital assistant, mobile telephone, video player), or the like.

Receiver 10 may be formed in custom hardware, or a combination of custom hardware and general purpose computing hardware under software control.

As will become apparent, video receiver 10 receives video, in the form of a video broadcast, digital video stream or the like. Decoder 12, in turn decodes the received video to form video fields or frames. Video processor 14 processes the decoded fields or frames, to scale, de-interlace, and otherwise manipulate the received video. FRC 16 converts the frame rate of processed video in order to generate video at a desired frame rate, different from that of the decoded video. Resulting higher rate frames are presented by display interface 18 on a display 20, for viewing. Display interface 18 may sample or receive frame video generated by FRC 16 to present images for display.

Display interface 18 may, for example, take the form of a conventional random access memory digital to analog converter (RAMDAC), a single ended or differential transmitter conforming to the VGA, S-Video, Composite Video (CVBS), Component Video, HDMI™, DVI or DisplayPort® standard, or any other suitable interface that converts data for display in analog or digital form on display 20.

As video is decoded and processed by video processor 14, video attribute information suitable for use by FRC 16 in performing frame rate conversion of the received video may be extracted. The attribute information is passed downstream, from video processor 14 to FRC 16. In the depicted embodiment, two separate channels 22, 24 may be used to pass video data and attribute data from video processor 14 to FRC 16. FRC 16, in turn, uses the received attribute data, and need not analyse decoded video frames to obtain (e.g. extract, determine, calculate, etc.) identical or similar attribute information.

More specifically, video decoder 12 decodes a received video signal into a stream of pixel values. The video signal arriving at video decoder 12, may originate with any conventional source, such as a satellite, or cable television channel, terrestrial broadcast channel, local video archive or peripheral device such as a DVD-Video player. The video signal may be analog or digital. Decoder 12 may thus take the form of a conventional video decoder, compliant with any one of a number of video encoding/compression standards, such as MPEG, MPEG 2, MPEG 4, divX, ITU Recommendation ITU-H.264, HDMI™, ATSC, PAL or NTSC television, digital video (e.g. ITU BT.601) or the like.

Figure 2:
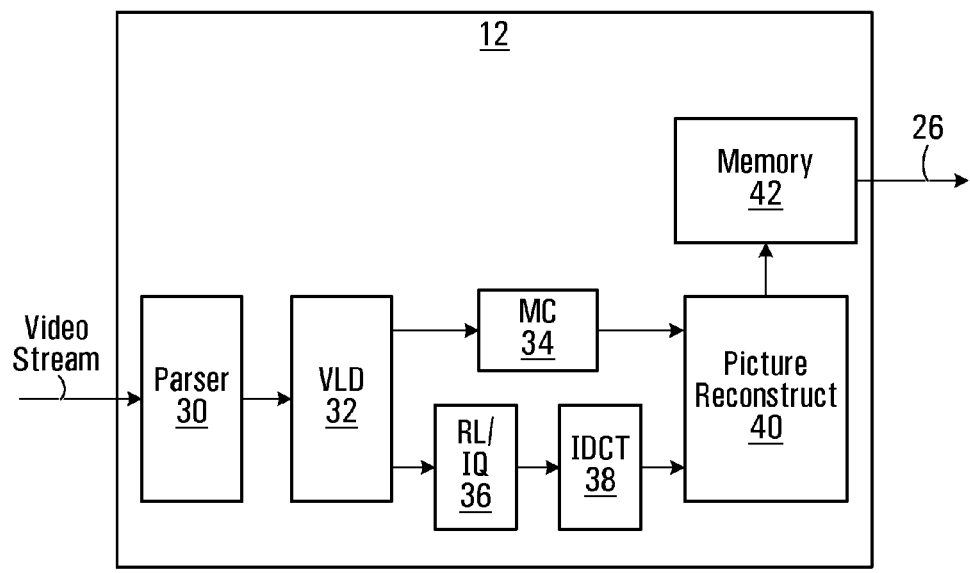
FIG. 2 is a simplified schematic block diagram of a video decoder forming part of the device of FIG. 1.

For ease of explanation, an example video decoder 12 is exemplified in FIG. 2, as an MPEG compliant decoder, and as such includes a parser 30 for parsing the received video stream, a variable length decoder (VLD) 32, a motion compensation block (MC) 34, a run length decoder and inverse quantization (RL & IQ) block 36, an inverse discrete cosine transform block (IDCT) 38, a picture reconstruction block 40 and memory 42 for storing frames/fields, as found in conventional MPEG decoders and known to those of ordinary skill. Decoder 12 is in communication with video processor 14 by way of link 26. Link 26 may be a serial or parallel link.

Figure 3:
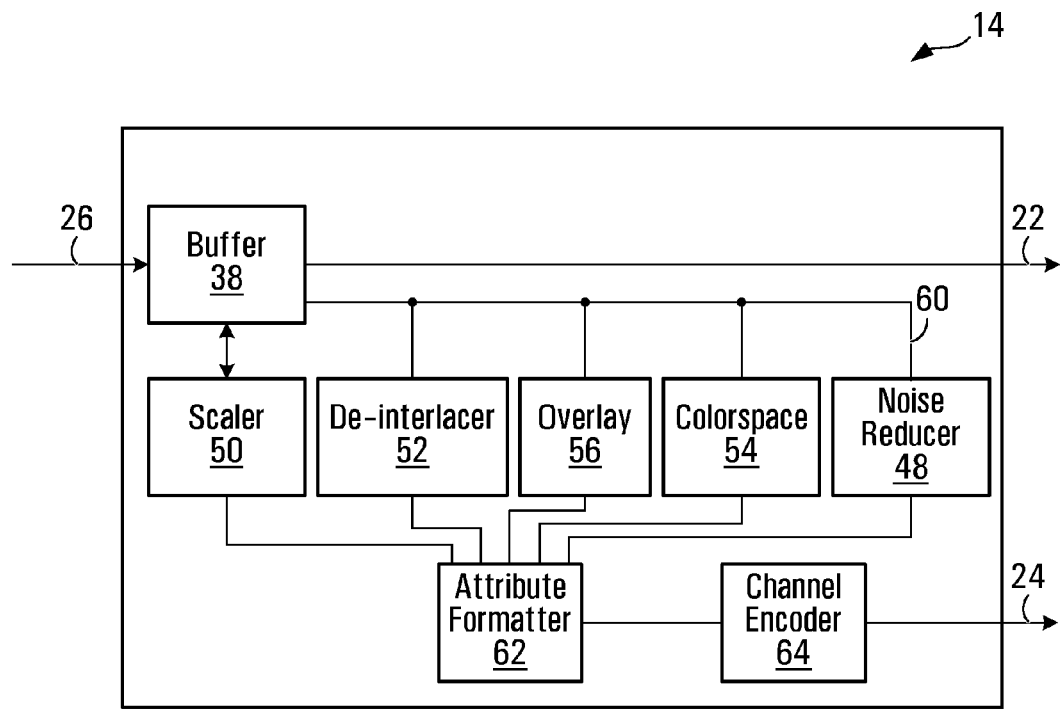
FIG. 3 is a simplified schematic block diagram of a video processor forming part of the device of FIG. 1.

An example video processor 14 is depicted in FIG. 3. As illustrated, video processor 14 includes at least one buffer in memory 58 to buffer pixel values received from video decoder 12. Exemplary video processor 14 includes several functional blocks to process video. Each functional block may perform a single function. Example video processor 14 includes a scaler 50, a de-interlacer 52, a color space converter 54, an effects/overlay engine 56, and a noise reduction block 48. A person of ordinary skill will readily appreciate that video processor 14 could include additional functional blocks not specifically illustrated.

An internal bus 60 interconnects scaler 50, de-interlacer 52, color space converter 54, an effects/overlay engine 56, and memory 58. In some embodiments, multiple internal buses may interconnect these components.

An attribute formatter 62 is further in communication with the remaining functional blocks of video processor 14. Attribute formatter 62, receives video attribute information from scaler 50, de-interlacer 52, color converter 54, and effects/overlay engine 56, and noise reducer 48. A further channel encoder 64 may further format attribute data as formatted by attribute formatter 62, for transmission on channel 24 to FRC 16 (FIG. 1).

Figure 4:
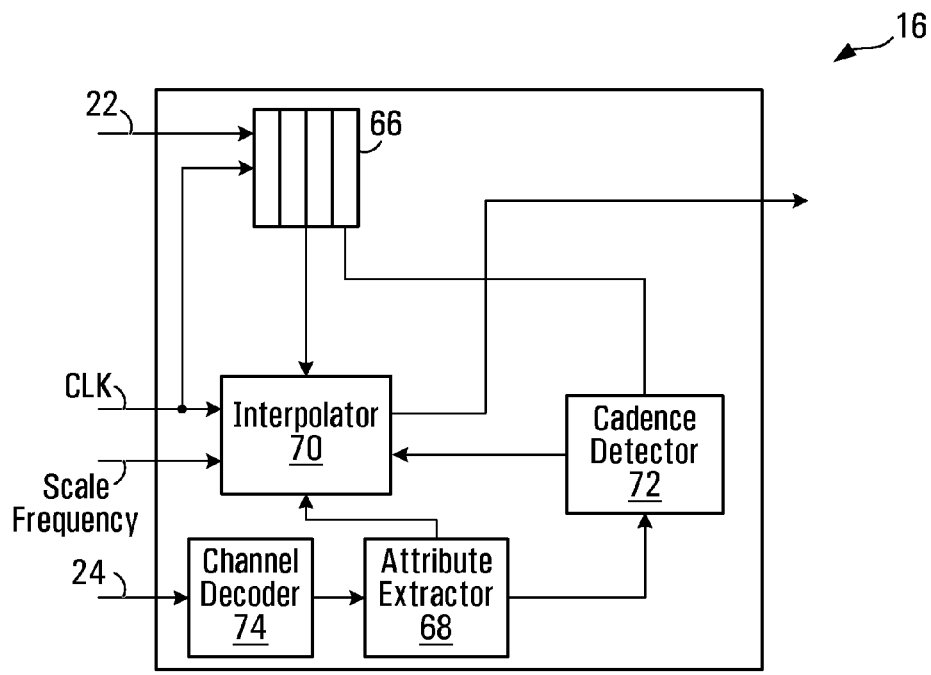
FIG. 4 is a simplified schematic block diagram of a frame rate converter forming part of the device of FIG. 1.

An example, FRC 16 is more particularly depicted in FIG. 4. As illustrated, example FRC 16 includes a buffer 66, an interpolator 70 that interpolates frames within buffer 66 in order to allow for frame-rate conversion. Buffer 66 may be first in, first out frame buffer or ring buffer used to store sequential frames that may be combined by interpolator 70. Buffer 66, may for example store four sequential frames F, for interpolation. Frame rate converter 16 further includes a channel decoder 74 and attribute decoder 68, complementary to channel encoder 64 and attribute encoder 62.

Interpolator 70 functions to interpolate frames in buffer 66, to form output frames at a frame rate (frequency) equal to the frequency of arriving frames at buffer 66, multiplied by a scaling factor SCALE_FREQU. A clock signal (CLK) times the arrival of the frames, and allows FRC 16 to derive the resulting frame rate. As FRC 16 produces more than one frame for each received frame, interpolator 70 functions to form interpolated frames, representative of motion between frames buffered in buffer 66. Such motion compensated interpolation is performed by frame rate converter 16, from two or more input frames in buffer 66.

Motion compensation/interpolation techniques that may be performed by interpolator 70 are generally discussed in Keith Jack, Video, 2005, Demystified (A handbook for the Digital Engineer), $4^{th}$ ed., and Watkinson, John, The Engineer's Guide to Standards Conversion, Snell and Wilcox Handbook Series (http://www.snellwilcox.com/community/knowledge_center/engineering/estandard.pdf), the contents of both of which are hereby incorporated by reference, and more specifically in U.S. patent application Ser. No. 11/616,192, naming the inventor hereof.

Figure 5:
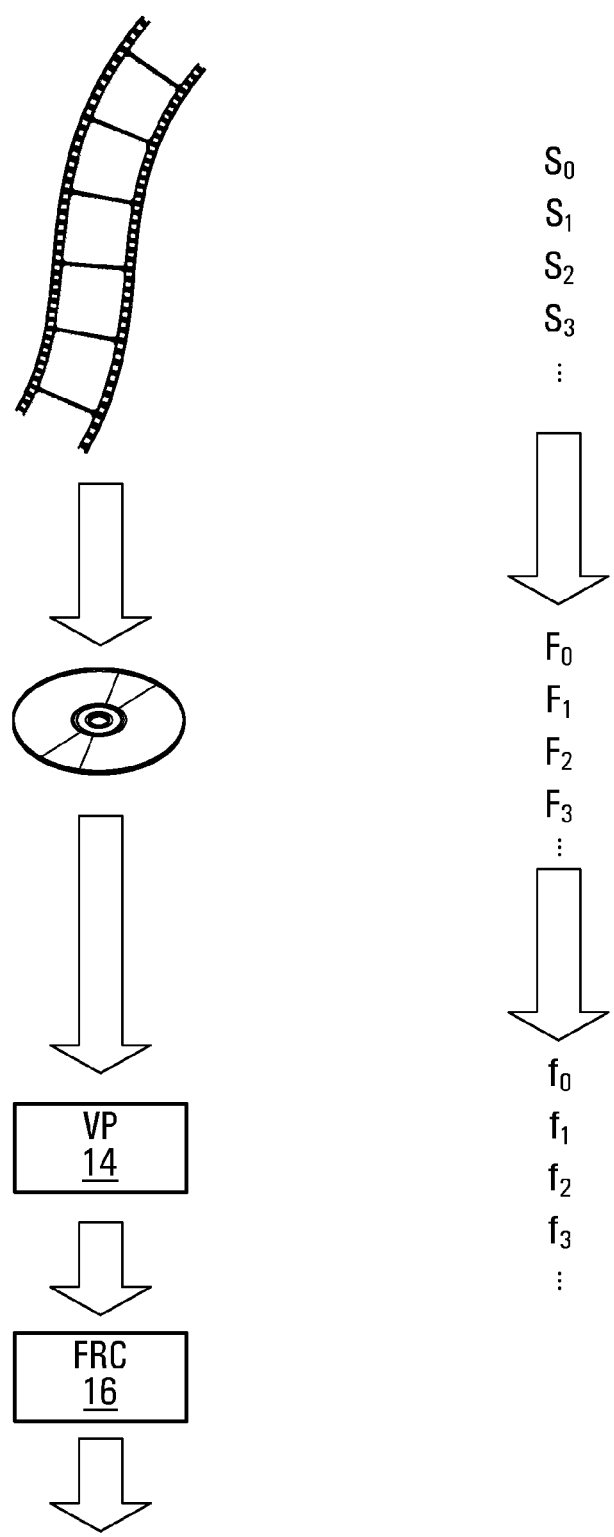
FIG. 5 schematically illustrates frames in frame rate converted output; decoded/processed output; and an original video source.

For clarity, as described herein, buffered frames (e.g. decoded frames output by video processor 14) are referred to as frames $F_0, F_1, F_2, \ldots F_n$, while unique frames in the video source are referred to as frames $S_0, S_1, S_2, \ldots$. Thus, for example, a 24 fps source may have source frames $S_0, S_1, S_2, S_3 \ldots$ and may have been converted to telecine format that would be decoded and/or reconstructed by video decoder 12 as fields or frames, and thereafter de-interlaced (if required) by video processor 14 to form frames $\{F_0, F_1, F_2, F_3, F_4, F_5, F_6, F_7, F_8, F_9, \ldots\}$ (at 60 fps) corresponding to source frames $\{S_0, S_0, S_0, S_1, S_1, S_2, S_2, S_2, S_3, S_3 \ldots\}$. Telecine converted frames $F_0, F_1, \ldots$ or fields may be stored on a recording medium, such as a DVD or the like, or broadcast using terrestrial, satellite or CATV broadcast techniques, in either analog (e.g. NTSC) format, or in digital format (e.g. MPEG stream, or the like), or be otherwise provided. Output frames, with converted frame rate, in turn will be referred as frames $f_0, f_1, f_2 \ldots f_n$, and may be formed from frames $F_0, F_1, \ldots$, as detailed herein. This is schematically illustrated in FIG. 5.

Interpolated frames are also denoted as $I\{S_j, S_{j+1}, l/m\}$, herein. This notation signifies a resulting motion interpolated frame that represents an intermediate frame between the original frames $S_j, S_{j+1}$, interpolated to represent fractional $l/m$ motion from $S_j$ to $S_{j+1}$. For example, an interpolated frame $I\{S_j, S_{j+1}, 1/2\}$, is a frame formed to represent motion halfway between $S_j$ and $S_{j+1}$. Such motion interpolation is performed by frame rate converter 16, from two input frames in buffers 66.

Figure 6:
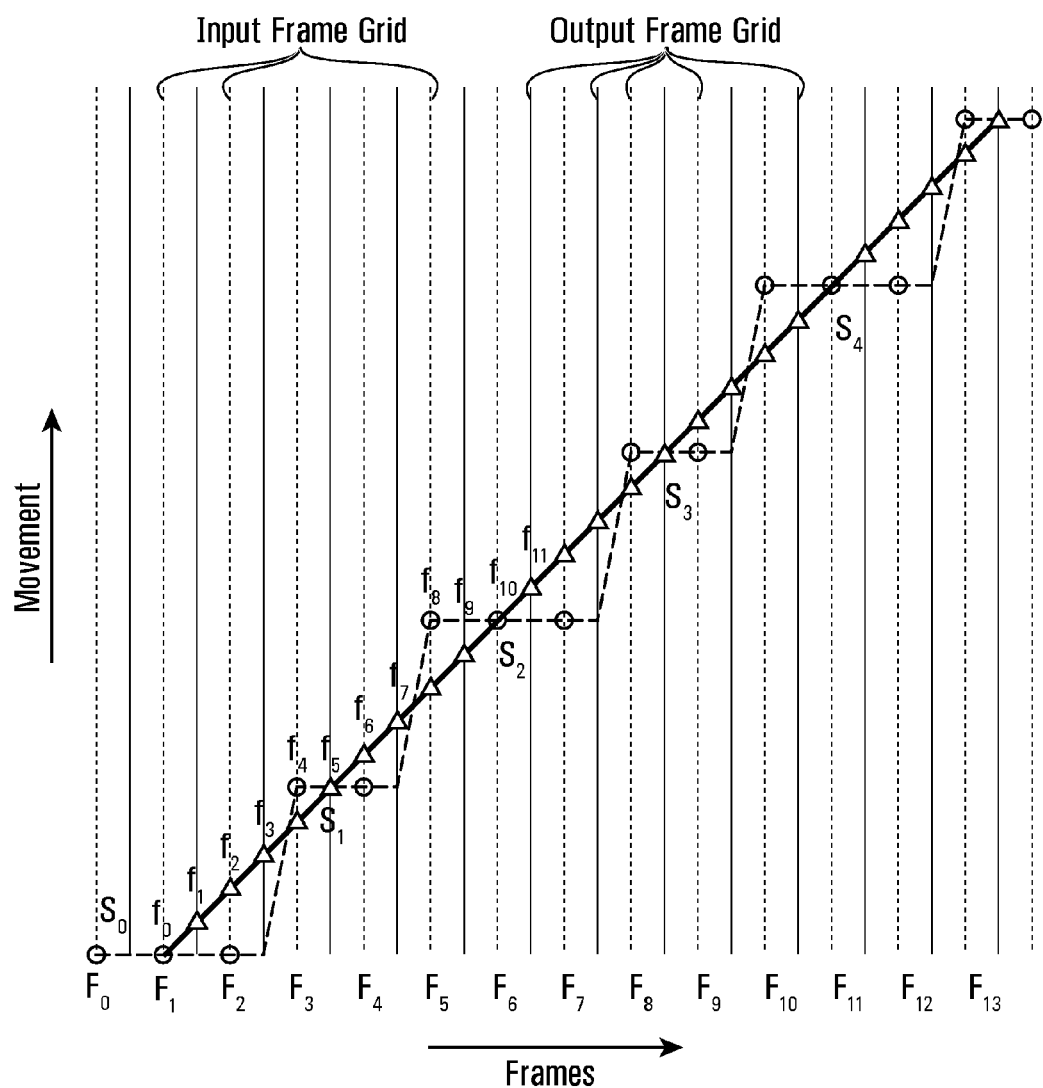
FIG. 6 is a motion graph illustrating motion in a frame rate converted video output from a decoded frame sequence, exhibiting a 3:2 pull-down pattern.

FIG. 6 is a graph depicting decoded/processed video frames and frame rate converted frames. Decoded/processed video frames are indicated along the dotted line; interpolated video frames are indicated along the solid line. Decoded/processed video frames are represented by a circle, while interpolated frames are represented as triangles.

As should now be appreciated, the degree of interpolation between decoded/processed frames, as well as which frames are to be interpolated by interpolator is dependent on the cadence of the decoded/processed video frames F. For example, in the presence of 3:2 pull-down pattern and frequency scaling ratio of two (SCALE_FREQU=2), interpolator 70 causes motion in each interpolated frames to advance in fractional fifths of the source frames; in the presence of 2:2 pull-down, in fractional fourths; and in the presence of no pull-down in fractional halves.

FIG. 6 illustrates motion in an example frame sequence, as output by video processor 14. More specifically, FIG. 6 illustrates the motion of an example frame sequence, $F_0, F_1, F_2, F_3 \ldots$ output by video processor 14. The depicted frame sequence originates with a 3:2 pull-down source, typically resulting from a conversion of 24 frames per second (denoted as source frames $S_0, S_1, S_2, S_3 \ldots$) to 60 interlaced fields per second, converted to 60 fps frames. As such, each second frame in the original (cinema) source is sampled twice, while every other second frame in the original source is sampled three times. Resulting frames $F_0, F_1, F_2, F_3$ exhibit the 3:2 pull-down pattern as they are formed by de-interlacing the interlaced fields.

The resulting frame sequence, exhibits jerky motion (referred to as "judder"), with motion only after the $3^{rd}, 5^{th}, 8^{th}, 10^{th}$ etc. decoded frame. This judder remains after frame rate conversion that does not account for the cadence of the video source.

In an effort to remove or reduce perceptible judder, frame rate converter 16 interpolates adjacent source frames, in order to form a rate converted frame sequence.

In operation, a video stream is received by video decoder 12, video decoder 12, in turn, parses the stream and forms a series of fields or frames, having a particular resolution. The series of fields or frames is provided as a pixel stream to video processor 14. The format of the decoded video is typically dictated by format of the encoded video. For example, horizontal, vertical resolution; aspect ratio; color format; and whether or not the video is provided as frames or field, for example, is dictated by the video's encoding.

At video processor 14, scaler 50, deinterlacer 52, color converter 54, and overlay engine 56, operate in conventional manners to provide frames of output video. In so processing the video, scaler 50, deinterlacer 52, color converter 54 and overlay engine 56, extract and/or create video attribute data. The order of operation of scaler 50, deinterlacer 52, color converter 54, and overlay engine 56 is not significant, and may be varied based on design objectives.

For example, scaler 50 may scale the decoded video to a desired size and aspect ratio. To do so, scaler 50 may optionally otherwise analyze the received frame to assess whether or not any regions of the received video contains black bars, the frequency content of the video, and the like. This attribute may be further used by scaler 50 to scale the decoded video. For example, the frequency content of the decoded frame could be provided as data representing a histogram; the beginning and end line and/or column of a matted (e.g. letter box) video image could be provided. Attribute data, including that received from decoder 12, and that formed by scaler 50 may also be passed downstream to attribute formatter 62.

Likewise, de-interlacer 52 may be used to convert interlaced fields of video to frames by first analyzing the sequence of received video fields to determine their cadence as for example detailed in U.S. patent application Ser. Nos. 10/837,835 and 11/381,254. Using this cadence information, received fields may be combined by de-interlacer to form de-interlaced frames of video. Video fields may, for example, be bobbed and/or weaved to form frames. As one frame of video is formed for each two fields, the cadence of the frame sequence will continue to reflect the cadence of the field sequence. This is, for example, detailed in U.S. patent application Ser. No. 11/616,192 referred to above. Cadence information, as detected by de-interlacer 52 is provided to attribute formatter 62. The cadence information may, for example, include several bits identifying the cadence as determined by de-interlacer 52. Example detected cadence may include the 3:2 pull-down pattern; 2:2 pull-down pattern; 3:3 pull-down pattern, or the like. Similarly, the absence of cadence (i.e. no cadence) may also be signalled to attribute formatter 62. Optionally, a scene change could be signalled by de-interlacer to attribute formatter 62.

Color space converter 54, likewise may convert the color space of the received video fields/frames to a desired color space. Data representing the resulting color space may also be passed downstream to attribute formatter 62. Similar, data representing an indicator of luma or gamma in the video and the like, (e.g. as a histogram of luma distribution, gamma information, and the like) could be signaled by color space converter 54 to attribute formatter 62.

Overlay/effects engine 56, may format the received video fields/frames to present the video in a particular format, as for example, picture-in-picture; picture-on-picture; or in conjunction with static images (e.g. TV guide, or the like). Attribute formatter 62 may receive the co-ordinates of each picture; context information, describing the nature of each overlay (e.g. computer generated, video, static, images, etc.) from overlay/effects engine 56.

Noise reduction block 48, may filter the received video to remove noise and/or artifacts. Attribute formatter 62 may receive information about the noise level, signal type, signal level and the like from noise reduction block 48.

So, attribute formatter 62, receives video attributes from the remaining functional blocks, such as scaler 50, de-interlacer 52, color converter 54, overlay engine 56, and noise reduction block 48. Attribute formatter 62 may format these in a suitable format so that these may be encoded on channel 24 and explicitly passed downstream to FRC 16.

Attribute formatter 62 formats the attribute data in a suitable format to accompany video frames generated by processor 14. For example, for each frame, attribute formatter 62 may encode attributes about that frame, and packetize this information. The actual format of each packet is somewhat arbitrary. The packet may take the form of bits, or bytes representing attribute information. The packet could alternatively contain text data identifying the attributes of interest, or could be formatted using a formatting language such as XML. Attribute formatter 62 may alternatively format attribute data in accordance with ITU Recommendation ITU-BT.1364-1, or in other ways understood by those of ordinary skill.

In any event, attribute data as formatted by attribute formatter 62 is passed downstream to channel encoder 64. Channel encoder 64 encodes the attribute data in an auxiliary channel in such a way that the encoded data remains synchronized with frames output by video processor 14. The auxiliary channel may take any form. For example, attribute data may be passed along a dedicated channel that may be provided by way of separate physical link, or that may be multiplexed with video or other data. One or more packets of attribute data may be generated with each frame. Channel encoder 64 include a multiplexer, and may format the attribute channel and multiplex it with video data to occupy unused portions of the video data (e.g. vertical blank or horizontal blank intervals), or the like. Similarly, channel encoder 64 could encode a separate physical channel that could carry data that is in some way synchronized to the video data. For example, the channel could be a synchronous stream, or an asynchronous carrying a packet transmitted with each frame.

At FRC 16, video data from video processor 14 is buffered in buffer 66, and attribute data is extracted from the attribute channel by channel decoder 74, and attribute extractor 68. Resulting attribute information may be provided to interpolator 70, and optionally to cadence detector 72.

If the attribute information includes cadence information about the incoming frame sequence, cadence detector 72 may be disabled, or cadence data generated by it may be ignored. Otherwise, if the auxiliary data does not include cadence information about the video, cadence detector 72 may determine cadence information from frames buffered in buffer 66, as detailed in U.S. patent application Ser. No. 11/616,192 identified above. Cadence information determined by detector 72 may only be determined after a particular frame has been buffered, and may thus lag the cadence information available from video processor 14, by one frame.

Conveniently, other attribute data extracted by attribute extractor 68 may be used by FRC 16 to adjust operating parameters of FRC 16, to improve interpolation. For example, overlay context attribute data may be used by FRC to independently process overlay regions. Luma information could be used to pre-filter the interpolated frames (e.g. scenes could be filtered differently based on their darkness). Gamma information could be used to do de-gamma first and then re-gamma. Frequency information about the video could be used to adjust or select filters of FRC 16, and its sensitivity. Information reflecting the type of noise and signal level could similarly be used to adjust filters and sensitivity of FRC 16. Other uses of attribute data by FRC 16 will be readily apparent to those of ordinary skill.

In particular, FRC 16 is provided with an identifier of the pull-down pattern by video processor 14 to perform interpolation, in order to produce motion compensated, interpolated frames from the original source frames. In order to accurately interpolate, the cadence indicator may be used to interpolate different (as opposed to repeated) frames in the source, and to adjust interpolation parameters (e.g. desired fractional motion from interpolated frame to interpolated frame).

FIG. 6 illustrates motion in a desired output frame sequence $f_0, f_2, f_3 \ldots$ output by frame rate converter 16, from a frame sequence $F_0, F_1, F_2 \ldots$. In FIG. 6, motion is depicted as a function of frame number. In the depicted example, frame rate converter 16 doubles the frame rate (i.e. SCALE_FREQU=2). As more frames are output by frame rate converter 16, than originally produced by video processor 14, interpolator 70 (FIG. 2) of frame rate converter 16 uses conventional motion compensation techniques in order to produce frames for presentation at the higher rate. In the depicted embodiment, each interpolated frame $f_j$ is either identical to a frame $F_i$ output by video processor 14, or formed from two adjacent source frames in the decoded frame sequence (e.g. $S_i$, $S_{i+1}$). Of course, more than two adjacent source frames could be used in producing interpolated frames.

In the illustrated example, motion compensation is performed to produce relatively smooth motion, and to reduce judder. In the depicted embodiment, motion is linearly interpolated, with equal motion between each of frames $f_0$, $f_2$, $f_3$, and so on. As sequential source frames S are not decoded at equal time intervals, any linearly interpolated sequence $f_0, f_2, f_3 \ldots$ will typically not include frames corresponding to frames $S_0, S_1, \ldots$ in the source, at the same times as these are decoded by video processor 14.

Notably, $f_0 = F_1$, while $f_1, f_2, f_3$, and $f_4$ are derived from an interpolation of $F_0$ (or equivalent frames $F_1$ or $F_2$) and $F_3$ (i.e. source frame $S_0$ and $S_1$). Each interpolated frame $f_1, f_2, f_3$, and $f_4$ advances motion from $F_0$ to $F_3$ (i.e. from frame $S_0$ to frame $S_1$ of the original source). Output frame $f_5$ is original source frame $S_1$ (i.e. frame $F_3/F_4$). Output frame $f_6$, and $f_7$ are similarly derived from decoder frames $F_3/F_4$ and $F_5$ (corresponding to source frames $S_1$ and $S_2$).

In the presence of a 3:2 pull-down pattern, FRC 16 relies on buffered frames that are up to three frames apart (i.e. $F_0$ and $F_3$; $F_3$ and $F_5$), FRC 16 will introduce a processing delay of at least this many frames. Thus $f_1$ is produced no earlier than after decoding of $F_3$. Similarly, $f_6$ is produced no earlier than after decoding $F_5$; and $f_{11}$ is produced no earlier than after decoding $F_8$.

Now, in the case 3:2 pull-down pattern and a frequency scaling of two, ten output frames are ideally produced for every five (3+2) buffered frames. This is also apparent in FIG. 6. Resulting frames $f_0, f_1, f_2, f_3, f_4, f_5 \ldots f_{10}$ correspond to $S_0$, $I\{S_0,S_1,1/5\}$, $I\{S_0,S_1,2/5\}$, $I\{S_0,S_1,3/5\}$, $I\{S_0,S_1,4/5\}$, $S_1$, $I\{S_1,S_2,1/5\}$, $I\{S_1,S_2,2/5\}$, $I\{S_1,S_2,3/5\}$, $I\{S_1,S_2,4/5\}$, $S_2$.

By contrast, the resulting frame pattern $f_0, f_1, f_2, f_3 \ldots f_{10}$ for a 2:2 pull-down source would correspond to frames $S_0$, $I\{S_0,S_1,1/4\}$, $I\{S_0,S_1,1/2\}$, $I\{S_0,S_1,3/4\}$, $S_1$, $I\{S_1,S_2,1/4\}$, $I\{S_1,S_2,1/2\}$, $I\{S_1,S_2,3/4\}$, $S_2$, $I\{S_2,S_3,1/4\}$, $I\{S_2,S_3,1/2\} \ldots$. That is, four output frames are produced for every buffered frame.

Similarly, the resulting frame pattern for no pull-down pattern (e.g. resulting from interlaced video) would corresponds to frames $S_0$, $I\{S_0,S_1,1/2\}$, $S_1$, $\{S_1,S_2,1/2\}$,$S_2$,$\{S_2$,$S_3,1/2\} \ldots$. Two output frames are produced for every buffered frame.

Of course, depending on the cadence of the decoded frames F, the location of source frames S in buffer 66 will vary.

Conveniently, attribute data is available with processed frames, as received by video processor 14. As such, FRC 16 may react quickly to the provided attribute data. For example, as the cadence of the video provided by video processor 14 changes, interpolation parameters used by FRC 16 may be adjusted. Thus, as soon as a change from a recognized pull-down pattern to no cadence is detected, interpolation may proceed to form interpolated frames corresponding to source frames $S_0$, $I\{S_0,S_1,1/2\}$, $S_1$, $\{S_1,S_2,1/2\}$,$S_2$,$\{S_2,S_3,1/2\} \ldots$. As attribute data is available with video data, latency required by analysis may be reduced.

As will be appreciated, attribute data provided to FRC 16 need not originate with video processor 14. Instead, attribute data could originate elsewhere upstream of FRC 14. For example, additional attribute data or some of the attribute data described could be obtained by decoder 12. For instance, motion vector data could be extracted by any MPEG or similar decoder used to form decoder 12; the source and/or type of decoded video (CVBS, component, digital, progressive, interlaced, VGA) could be passed as attribute data. Again, other attribute data available upstream of FRC 14 will be apparent to those of ordinary skill.

As should now also be appreciated, a video receiver need not include decoder 12. Instead, decoded video from an external source could be provided to an exemplary video device, including only video processor 14, frame rate converter 16, and optional display interface 18.

Similarly, video processor 14 and FRC 16 could be formed in different physical devices. For example, video processor 14 could form part of a video receiver, video player, dedicated video processor or the like, while FRC 16 could form part of a display device, such as a flat panel display. The link between video processor 14 and FRC 16 could then be a physical link, complying with a video interconnect standard, such as the DVI, HDMI™ or DisplayPort® standard. Channels 22 and 24 may then be channels carried by the interconnect. For example, channels 22 and 24 could be carried on an HDMI™ interconnect.

Further, although attribute data has been described as being provided synchronously, it may also be buffered at video processor 14, and may be extracted or pulled from video processor 14, by FRC 16 or some other processor (such as a host processor). Video processor 14 may accordingly include sufficient storage memory for storing attribute data and provide a suitable interface (such as a software application programmer interface (API)) for querying the data. Optionally video processor 14 may buffer the attribute data for several frames. The attribute data may then be queried as required.

Figure 7:
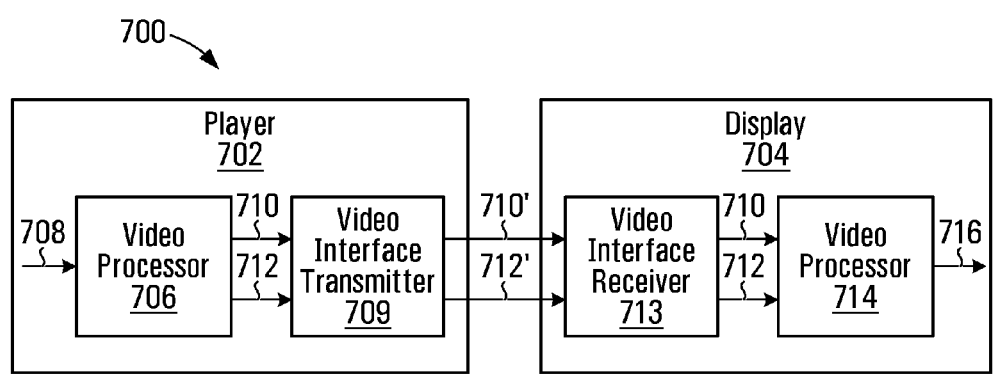
FIG. 7 is a simplified schematic block diagram of an alternative exemplary video receiver.

FIG. 7 is a simplified schematic block diagram of a system 700 containing a video source and a video sink, exemplary of an alternative embodiment. The exemplary video source is a player device 702 and the exemplary video sink is a display device 704. The player device 702 may be a PC, DVD-Video player, HD-DVD player, Blu-Ray disc player, or set-top box, for example. The display device 704 may be a monitor or television that may be an analog or digital device, such as a Cathode Ray Tube (CRT), flat panel display such as Liquid Crystal Display (LCD) or plasma display, or rear-projection display such as Digital Light Processing (DLP) display or Liquid Crystal on Silicon (LCoS) display for example. In the illustrated embodiment, the two devices may be interconnected by a physical link complying with a video interconnect standard, such as the DVI, HDMI™, DisplayPort®, Open LVDS Display Interface (OpenLDI), or Gigabit Video Interface (GVIF) standard for example. In some embodiments, the interface could be governed by a proprietary signaling protocol. The devices 702 and 704 may be components of a home entertainment system for example.

As illustrated in FIG. 7, player 702 contains a video processor 706 and a video interface transmitter 709. Depending upon the nature of player 702, the player may further contain other components, such as a decoder and frame rate converter for example, but only the video processor and video interface transmitter are illustrated in FIG. 7 for clarity.

Video processor 706 receives video data 708 and performs various processing, as described below, upon the video data to improve the appearance or quality of the video images. The received video data 708 may be a decoded video signal (e.g. a stream of pixel values) output by a decoder component of player 702 (not illustrated), based on an input video signal for example. The decoder component may be similar to the video decoder of FIG. 1. The input video signal received by the decoder may originate with any conventional source, such as a satellite, or cable television channel, terrestrial broadcast channel, local video archive or storage medium such as memory, hard disk or an optical disk. The video signal may be analog or digital. Video processor 706 has two outputs, namely, processed video data 710 and metadata 712. Processed video 710 is the video data 708 after the application of video processing by video processor 706. Metadata 712 is information about the video processing that has been applied by video processor 706. Video processor 706 is described in greater detail below.

Video interface transmitter 709 receives processed video data 710 and metadata 712 and encodes them into a suitable format for transmission across the physical link between the video player device 702 and the video display device 704. The specific format of the encoded video data 710' and encoded metadata 712' depends upon the video interconnect standard operative on the physical link (which may be a wire or wireless physical link) between the devices 702 and 704. For example, if operative video interconnect standard is DVI or HDMI™, the Transmission Minimized Differential Signaling (TMDS) protocol may be used. The encoded video data 710' and the encoded metadata 712' may occupy the same channel or different channels over the link. If the same channel is used, the encoded metadata 712' may be multiplexed with the encoded video 710', e.g. occupying unused portions of the video data stream (e.g. vertical blank or horizontal blank intervals). If multiple channels are used, the metadata 712' may be encoded on an auxiliary channel that is distinct from a primary channel over which video data 710' is transmitted. For example, if the operative video interconnect standard is DVI or HDMI™, the Display Data Channel (DDC) could be employed. If the operative video interconnect standard is HDMI™, the optional Consumer Electronics Control (CEC) Channel (if implemented) could be used in the alternative (or in conjunction with) the DDC channel. In the case of DisplayPort®, the Auxiliary Channel could be used.

As further illustrated in FIG. 7, the display device 704 includes a video interface receiver 713 and a video processor 714. Like the player device 702, the display device 704 may further contain other components, such as tuner or a demodulator for example, however only the above-noted components are illustrated in FIG. 7, for clarity.

The video interface receiver 713 receives video data 710' and metadata 712' over the physical link and decodes them to a format expected by the video processor 714. The function of receiver 713 is complementary to the function of transmitter 709 of the video player 702. In the present embodiment, the decoded video and metadata have the same format as the video data and metadata supplied to the video interface transmitter 709 of player device 702, thus the same reference numerals 710 and 712 are used to identify them in the video display device 704. This is not necessarily true of all embodiments.

The video processor 714 of the present embodiment has video processing capabilities that are identical to the video processing capabilities of video processor 706. This may be by virtue of the fact that the display 704 and player 702 are modular components that are intended to be capable of interconnection with other displays or players whose video processing capabilities may vary. In other words, each of the player 702 and display 704 may incorporate the same video processing capabilities for possible use depending upon video processing capabilities of the complementary component to which it is connected. The capabilities of video processors 706 and 714 need not be identical in all embodiments, however. They may be partly the same or wholly different in alternative embodiments. Video processor 714 receives processed video data 710 and metadata 712 from receiver 713 and performs various processing upon the video data. As will become apparent, the nature of the processing that is performed by video processor 714 is determined, at least in part, by the metadata 712. After the processing has been applied, the processed video data 716 is output to other components or for display. Video processor 714 is described in greater detail below.

Figure 8:
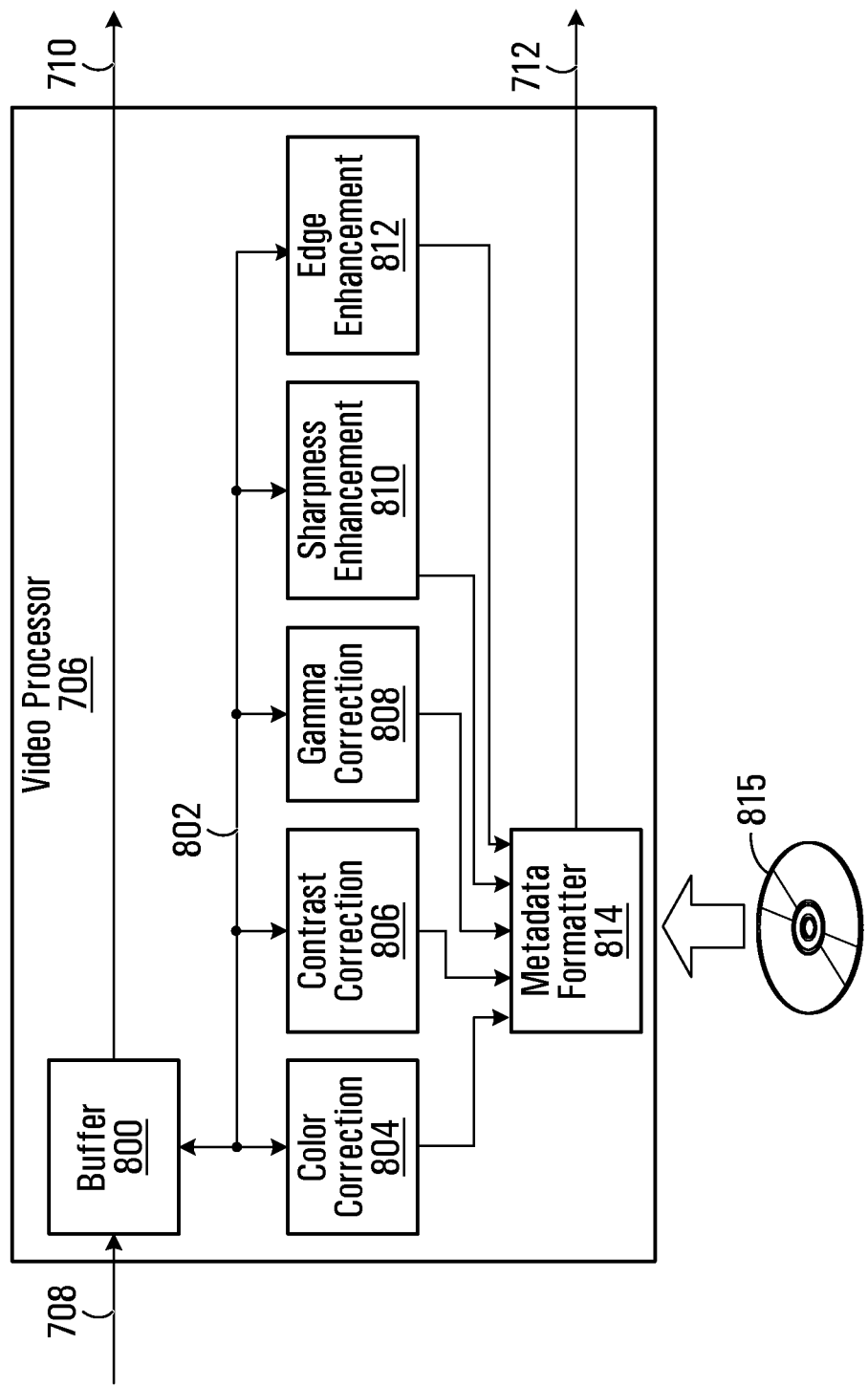
FIG. 8 is a simplified schematic diagram of a video processor forming part of the device of FIG. 1.

FIG. 8 illustrates video processor 706 (the "upstream video processor") in greater detail. As illustrated, video processor 706 includes a buffer 800, bus 802, various functional blocks for processing video, namely a color correction block 804, a contrast correction block 806, a gamma correction block 808, a sharpness enhancement block 810, and an edge enhancement block 812, as well as a metadata formatter 814. Certain components of video processor 114, such as buffer 800 and bus 802, are analogous to components of video processor 14 (FIG. 3) of the same name, namely buffer 58 and bus 60 (respectively), and are thus not described in detail here. The other components are described below.

Color correction block 804 performs various operations on color video data for the purpose of adjusting the color that will be perceived by a human viewer of the displayed data. For example, the color corrections may entail adjusting the intensity mix of basic constituent colors (e.g. red, green and blue) to cause a viewer to perceive desired color shades. If the video data is represented in the YCbCr color space, for instance, color correction may be implemented by multiplying both Cb and Cr by a constant.

Contrast correction block 806 performs contrast correction upon video data. As is known in the art, contrast refers to how far the "whitest whites" are from the "blackest blacks" in a video waveform. If the video data is represented in the YCbCr color space, for instance, contrast correction may be implemented by multiplying the YCbCr data by a constant, possibly with a corresponding adjustment to Cb and Cr to avoid any undesired color shift.

Gamma correction block 808 performs gamma correction upon video data. As is known in the art, gamma refers to the nonlinearity of the transfer characteristics of most displays in terms of the degree of change in display brightness level resulting from a change in amplitude of an input video signal. Gamma corrections are generally non-linear corrections.

Sharpness enhancement block 810 engages in processing which improves the sharpness of video data. The sharpness of a picture may for example be improved by increasing the amplitude of high-frequency luminance information.

Edge enhancement block 812 engages in processing which enhances the appearance of edges within the video data. The appearance of edges of objects represented within the video data may be enhanced by reducing the jagged appearance of the edges, using various techniques.

It will be appreciated that the functional blocks 804, 806, 808, 810, and 812 are not necessarily distinct in all embodiments, but rather could be combined in various ways. For example, the contrast and gamma correction blocks 806 and 808 could be combined into a single functional block, or the sharpness and edge enhancement blocks 810 and 812 could be combined into a single functional block. Other combinations could be made by persons of ordinary skill. Moreover, functional blocks that perform other types of video processing could be employed in alternative embodiments.

Functional blocks 804, 806, 808, 810, and 812 operate upon the video data 708 stored in buffer 800 to create processed video data 710. In some embodiments, the specific operations that are performed by the various functional blocks may be configurable by way of a graphical user interface (GUI) presented on display device 704. The GUI interface may permit the user to activate or deactivate individual functional blocks or otherwise control the operation of the functional blocks through the manipulation of GUI controls. The user may be able to observe the effect of the configuration upon a displayed "test" image, for example, as the GUI controls are manipulated.

It should be appreciated that the video processing performed by functional blocks 804, 806, 808, 810 and 812 may be conventional. However, each of these blocks also communicates information about the video processing that it is performed to metadata formatter 814, which in turn formats this information as described below and communicates it to display device 704 for use in determining what further video processing, if any, should be performed by the separate video processor 714 of that device.

More specifically, metadata formatter 814 generates metadata representing the video processing performed by functional blocks 804, 806, 808, 810 and 812. The metadata is generated based on information provided to the metadata formatter 814 by each of functional blocks 804, 806, 808, 810 and 812. The generated metadata typically indicates both the type(s) of video processing performed (e.g. color correction and sharpness enhancement) and the specific adjustments performed (e.g. the multiplier by which Cb and Cr values have been scaled to achieve color correction and the amount by which the amplitude of high-frequency luminance information has been increased to achieve sharpness enhancement), although this is not absolutely required. In some embodiments, only the type of video processing that is performed may be indicated. Metadata formatter 814 formats the metadata 712 into a suitable format to accompany the processed video data 710. The format of metadata may for example be binary or textual. The metadata 712 may be packetized or may take the form of a data structure. In some embodiments, the metadata may be expressed in a markup language such as XML. In some embodiments, metadata formatter 814 could format attribute data in accordance with ITU Recommendation ITU-BT.1364-1. Other formats could be utilized in alternative embodiments.

Figure 9:
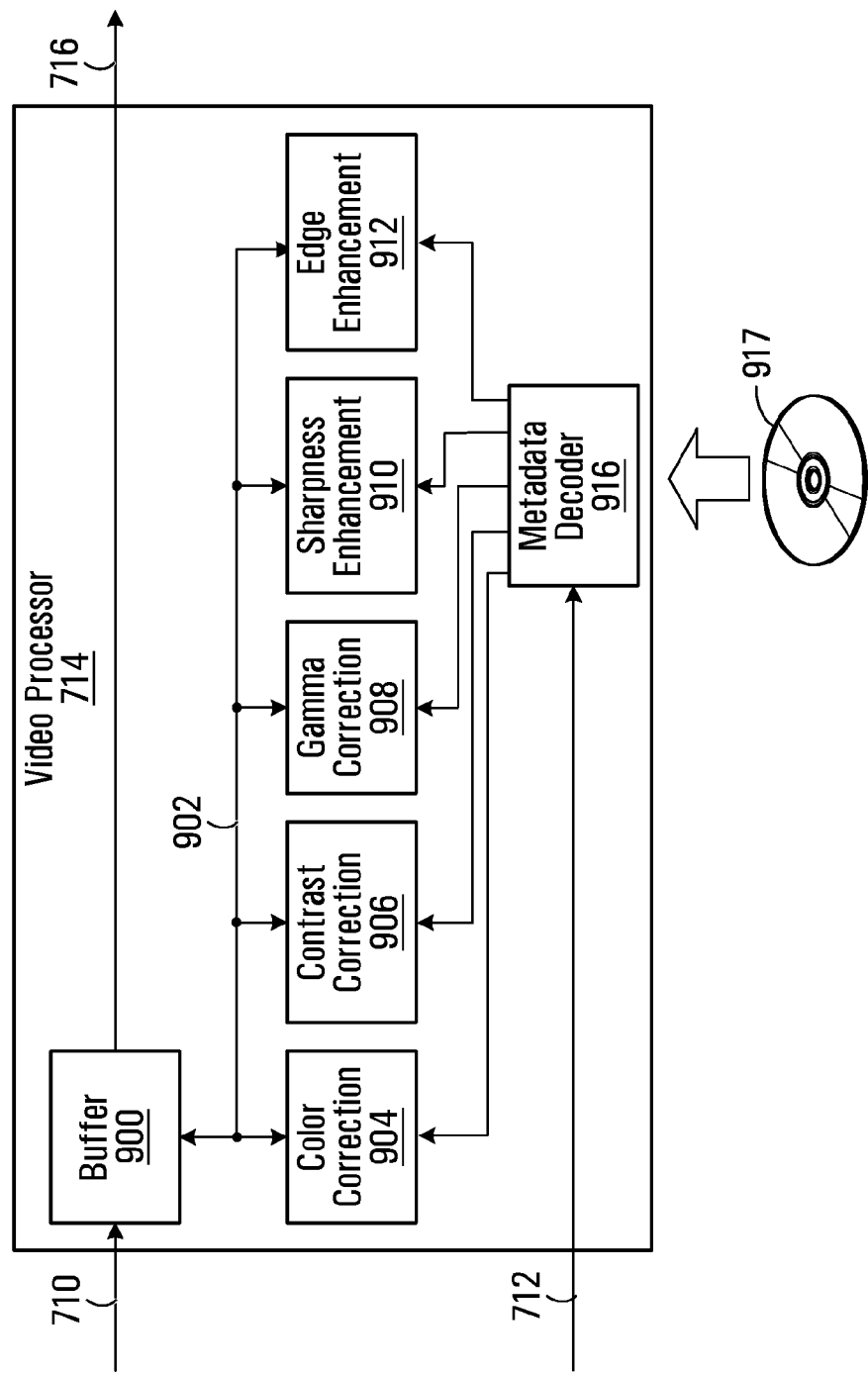
FIG. 9 is a simplified schematic diagram of another video processor forming part of the device of FIG. 1.

Referring to FIG. 9, the video processor 714 of FIG. 7 (the "downstream video processor") is illustrated in greater detail. The video processor 714 includes a buffer 900, a bus 902, a series of functional blocks 904, 906, 908, 910 and 912 for processing video, and a metadata decoder 916.

Buffer 900 stores processed video data 710 received from the upstream player device 702 while functional blocks 904, 906, 908, 910 and/or 912 operate upon the video data to create processed video data 716.

Functional blocks 904, 906, 908, 910 and 912 are analogous to functional blocks 804, 806, 808, 810 and 812, respectively. Accordingly, video processor 714 is capable of performing the same type of video processing as video processor 706. However, unlike the video processing of processor 706, the video processing performed by functional blocks 904, 906, 908, 910 and 912 of processor 714 is determined, at least in part, by the metadata 712 received from player device 702, as will become apparent.

Metadata decoder 916 decodes the metadata 712 received from video interface receiver 713 (FIG. 7). The operation of decoder 916 is complementary to the operation of metadata encoder 814 of the player device 702 (FIG. 8). The metadata decoder 916 communicates relevant portions of the metadata to individual functional blocks 904, 906, 908, 910 and 912. For example, if the metadata 712 indicates that video processor 706 had applied color correction and sharpness enhancement video processing and further indicates the specific adjustments that were performed to achieve color collection and sharpness enhancement, then the color correction metadata would be communicated to color correction block 904 and the sharpness enhancement information metadata would be communicated to sharpness enhancement block 910. This information is then used by functional blocks 904 and 910 to assist in determining the video processing to be applied to the video data 710.

Figure 10:
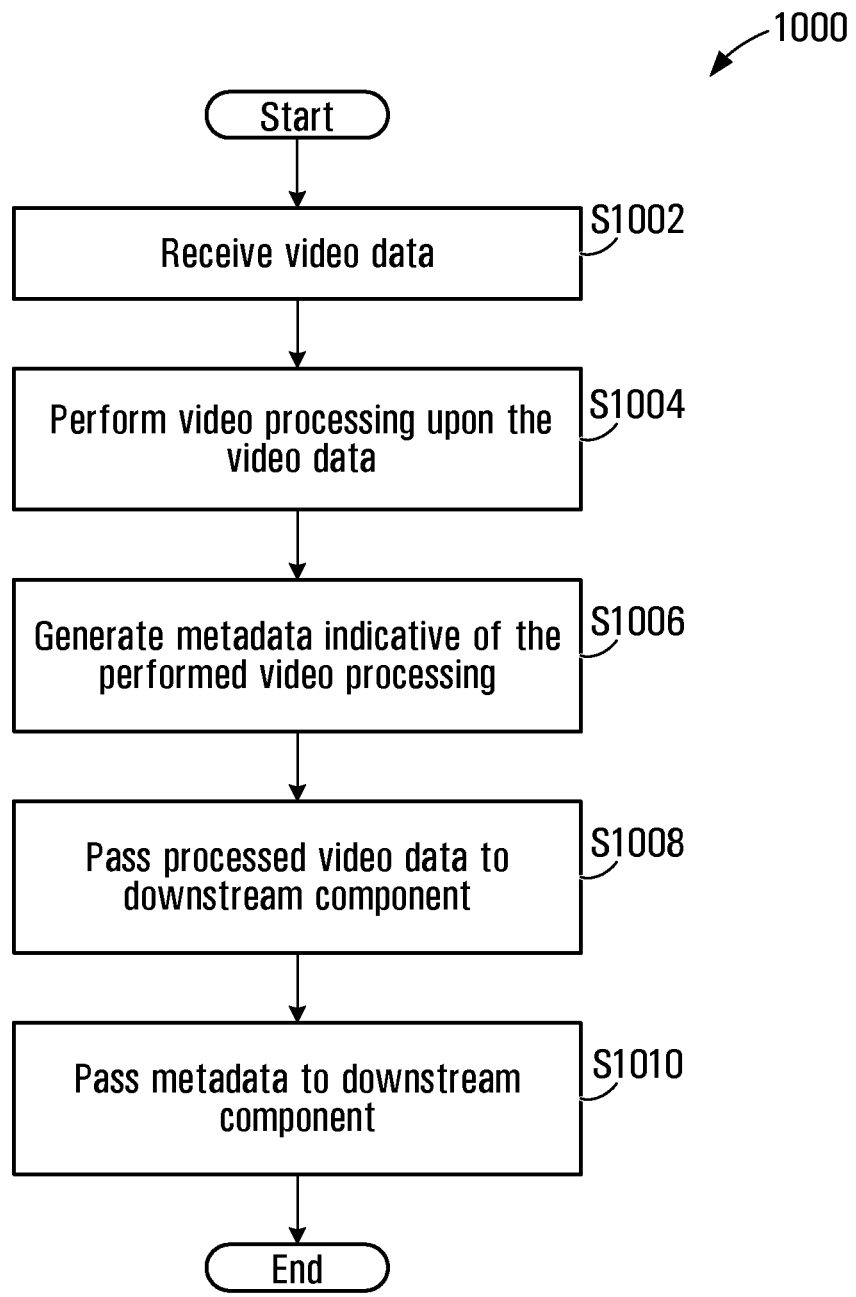
FIG. 10 is a flowchart illustrating operation of the video processor of FIG. 8.
Figure 11:
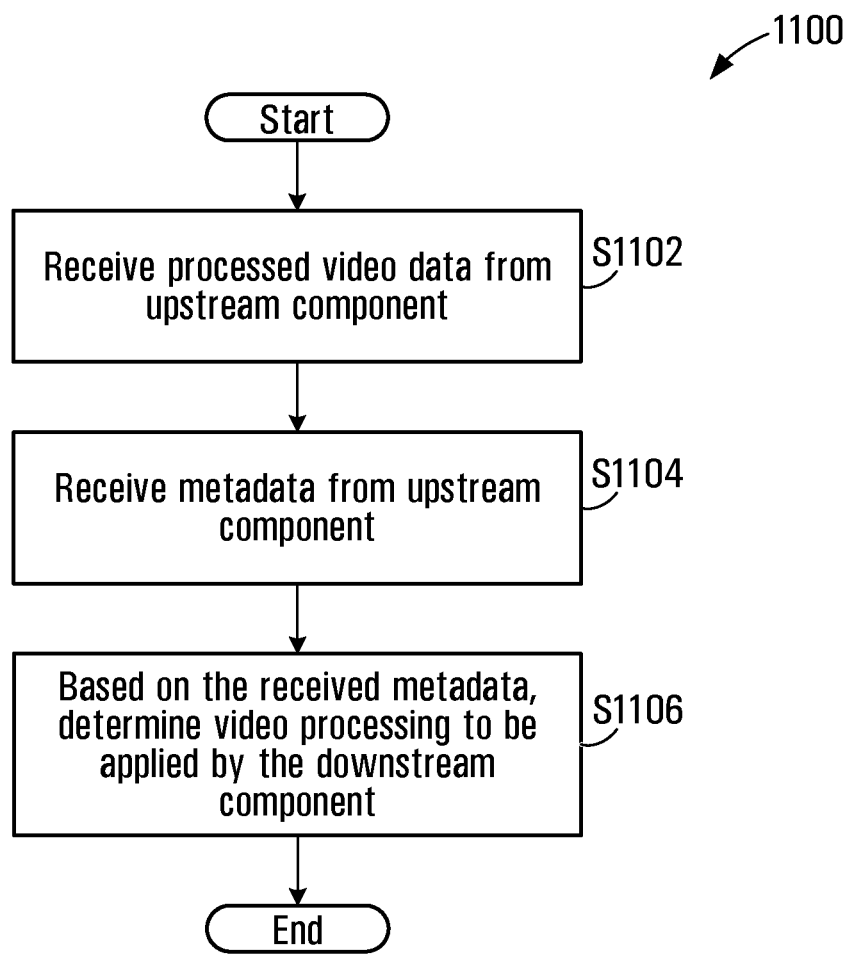
FIG. 11 is a flowchart illustrating operation of the video processor of FIG. 9.

Operation of the present embodiment is illustrated in FIGS. 10 and 11. FIG. 10 illustrates the operation 1000 of the video processor 706 within player device 702 while FIG. 11 illustrates the complementary operation 1100 of video processor 714 within display device 704 (FIG. 1).

Referring to FIG. 10, video data is received (S1002) at video processor 706 and stored in buffer 800 (FIG. 8). Thereafter, one or more of the functional blocks 804, 806, 808, 810 and 812 operates upon the received video data from the buffer 800 to create processed video data 710 (S1004). The video processing that is applied may be based wholly or partly upon: user preferences; the nature of the video signal (e.g. a determined quality of the signal); factory presets within player device 702; or a combination of these. As the operative functional blocks process the video data, they communicate information about the type of video processing that is performed to the metadata formatter 814.

In turn, the formatter 814 generates metadata representing the video processing that is performed by functional blocks 804, 806, 808, 810 and/or 812 (S1006). In some embodiments, the metadata is generated from scratch by the video processor 706. That is, the metadata 712 may originate from the video processor 706, being based solely on the video processing that the video processor 706 has applied to the video data. In other embodiments, the video processor 706 may receive "source metadata" from the same source that provided the video data that was originally received at S1002 (above), and may supplement or extend that metadata to create metadata 712. In one example, player device 702 may read video data from a storage medium such as a DVD and may also read source metadata from that storage medium along with the video data (in this case the storage medium may constitute the "source"). In another example, the source metadata may be received from a different source—a network (e.g. a local area network, wide area network, broadcast network or cable provider network). In the latter case, the video data and metadata may be received at player device 702 from a satellite or terrestrial transmitter. The source metadata may for example describe the video processing that has been applied to the video data stored on the storage medium or received from the network (as appropriate), e.g. during authoring. In such embodiments, when the formatter 814 of video processor 706 "generates metadata 712", the formatter may supplement or override the received metadata to reflect the video processing that has been performed by processor 706. This supplementing or overriding may be performed in a similar fashion to the analogous processing that is performed by the intermediate device 1204 illustrated in FIG. 12, which is described below.

Regardless of whether the metadata 712 originates from video processor 706 or constitutes "source metadata" that has been supplemented or overridden by video processor 706, both the processed video data 710 and the metadata 712 are thereafter passed to the display device 704 (S1008, S1010). Prior to transmission over the physical link to display device 704, the video data 100 and metadata 712 are encoded by video interface transmitter 709 for transmission over the link as encoded video data 710' and metadata 712'.

When metadata 712 is encoded along with processed video data 710 for transmission over the physical link conforming to a known video interconnect standard, it is generally beneficial (although not absolutely required) to encode the metadata so as not to impact upon the video data that a downstream device conforming to the standard expects to receive. This is so that, if the downstream component is a legacy component that is not capable of utilizing, or does not even to expect to receive, metadata 712, it will still be able to use the processed video data 710. This contributes to the backward compatibility of the video player device 702 with older video display devices. Conversely, a component such as video display device 704 that is capable of utilizing encoded metadata as described below may be made backwardly compatible with an older video player device that does not generate such metadata simply making it capable of applying video processing in a default manner (e.g. according to user preferences specified by way of an on-screen display configuration mechanism) when no metadata is received over the physical link between the devices.

It should be appreciated that the nature of the video processing performed by the various functional blocks 804, 806, 808, 810 and 812 does not necessarily change from video frame to video frame. That is, the video processing that is performed by video processor 706 may be universally applied to all video frames. Accordingly, the metadata 712 does not necessarily need to accompany each output frame of the processed video data 710. For example, the metadata 712 could be communicated only once during a system initialization step or periodically, e.g., at predetermined time intervals. Of course, if bandwidth permits, the metadata could accompany each frame of video data, if desired. Operation 1000 is thus concluded.

Referring to FIG. 11, the encoded video data 710' and metadata 712' are received at the video interface receiver 713 of display device 704, are decoded, and are output as processed video data 710 and metadata 712. The processed video data 710 is received at the video processor 714 (S1102) and stored in buffer 900 (FIG. 9). The metadata 712 is also received (S1104) and is decoded by metadata decoder 916. Metadata decoder 916 communicates relevant portions of the metadata to individual functional blocks 904, 906, 908, 910 and 912. This information is thereafter used by the functional blocks determine what further video processing, if any, should be applied to video data 710 (S1106). For example, if the metadata indicates that color correction video processing has already been applied by the color correction block 804 of video processor 706, then color correction block 904 of video processor 714 may refrain from applying color correction to avoid redundant or unnecessary video processing. Alternatively, if the type of color correction applied by the upstream color correction block 804 is known, the color correction block 904 of video processor 714 may opt to perform other color correction processing that provides a further benefit at display device 714, in terms of the quality of the resulting video images for example. For example, assuming that the player device 702 is not aware of the type, model or capabilities of the downstream display device 704, then the video processor 714, likely having superior information about the capabilities of the display device 704 for presenting color images (e.g. based on knowledge of the number, dot pitch or arrangement of pixels), may determine that further color correction processing at color correction block 904, which is supplementary to processing earlier performed by color correction block 804, would be beneficial.

Once the functional blocks 904, 906, 908, 910 and/or 912 have applied further processing to video data 710 (if any), the processed video data 716 is passed to downstream components and is ultimately displayed. Operation 1100 is thus concluded.

It will be appreciated that the above-described operation is not limited to video processors within player devices and display devices. The same approach could be used for distinct video processors within other types of devices or components.

Figure 12:
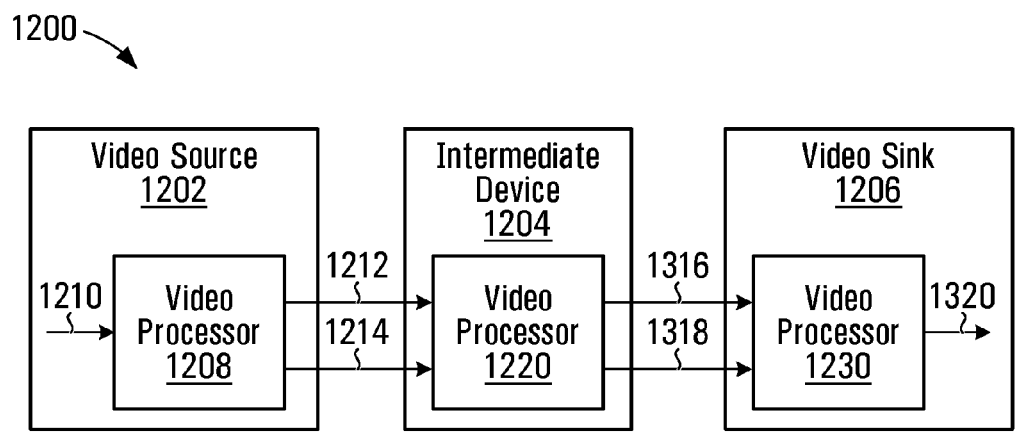
FIG. 12 is a simplified schematic block diagram of an exemplary system.

FIG. 12 is a simplified schematic block diagram of a system 1200 exemplary of an alternative embodiment. The system 1200 contains a video source 1202, an intermediate device 1204, and a video sink 1206. The components 1202, 1204 and 1206 are interconnected as shown in FIG. 12 by physical links between the components that may conform to known video interconnect standards, such as DVI, HDMI™ or Display Port®. The interconnection between components 1202 and 1204 may conform (but does not necessarily conform) to the same video interconnect standard as the interconnection between components 1204 and 1206. The video source and video sink devices 1202 and 1204 are similar to the video source and video sink devices 702 and 704 (respectively) of FIG. 7, although their video processing capabilities may extend beyond those specifically indicated for these devices above. The primary difference of system 1200 from system 700 of FIG. 7 is the presence of an intermediate device 1204 between the video source device 1202 and the video sink device 1206.

The video source 1202 contains a video processor 1208 that is similar to video processor 706 of FIG. 7, with the exception that the video processing capabilities of processor 1208 are not necessarily limited to those of processor 706. For clarity, components of video source 1202 other than video processor 1208, such as a decoder, frame rate converter and a video interface transmitter (which may be analogous to video interface transmitter 709 of FIG. 7) are omitted. The video processor 1208 receives video data 1210 and performs various processing upon the video data to improve the appearance or quality of the video images. The video processing may include virtually any type of video processing, such as de-interlacing, inverse telecine, de-noise, scaling, color correction, contrast correction, gamma correction, sharpness enhancement, or edge enhancement for example. The processed video is output as processed video data 1212, while information about the video processing that has been performed by video processor 1208 is output as metadata 1214. The metadata 1214 may be similarly generated and may have a similar format to metadata 712 described above. The operation of video processor 1208 is further described below.

The intermediate device 1204 is a standalone video processing component, such as a DVDO® iScan™ VP50 High Definition audio/video processor from Anchor Bay Technologies, Inc., adapted as described herein, whose purpose is to improve the image quality of the video stream destined for the downstream video sink device 1206. The intermediate device 1204 is capable of not only adjusting the video processing that it performs based on the received metadata 1214 (i.e. metadata indicative of video processing applied by the upstream video source 1202), but also of supplementing or overriding that metadata to reflect any additional video processing performed by the device 1204.

The intermediate device 1204 includes a video processor 1220. Other components, are omitted for clarity. The video processor 1220 is illustrated in greater detail in FIG. 13.

Figure 13:
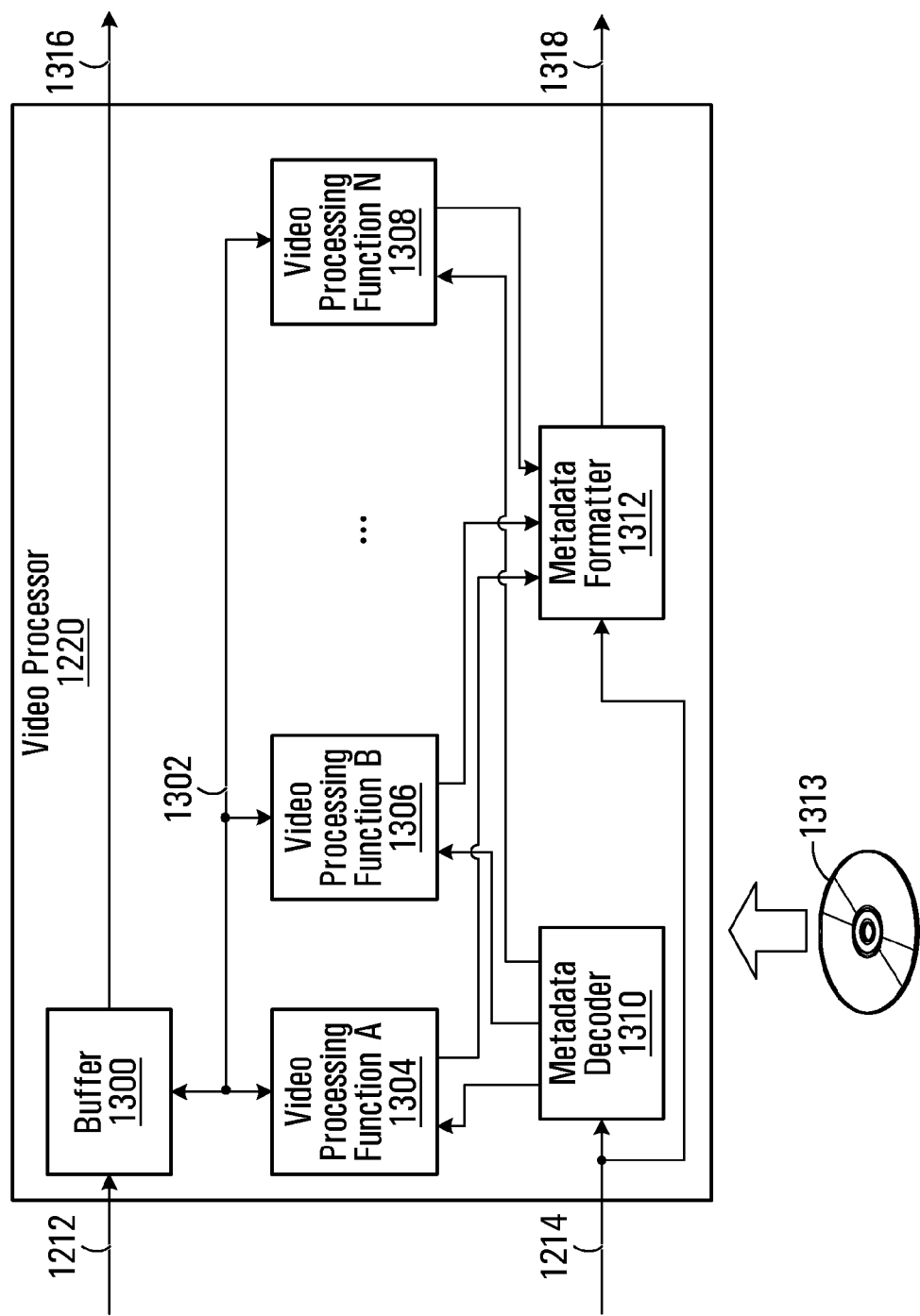
FIG. 13 is a simplified schematic diagram of a video processor in an intermediate device within the system of FIG. 12.

As shown in FIG. 13, video processor 1220 (the "intermediate video processor") includes a buffer 1300, bus 1302, various functional blocks 1304, 1306 and 1308 for processing video, a metadata decoder 1310 and a metadata formatter 1312. The buffer 1300 and bus 1302 are analogous to the buffer 900 and bus 902 of FIG. 9, and are thus not described in detail here.

Each of the functional blocks 1304, 1306 and 1308 is capable of performing a video processing function upon video data 1210 that has been received by the processor 1220 (possibly by way of an video interface receiver within the device 1204) and stored within buffer 1300. The functions may include de-interlacing, inverse telecine, de-noise, scaling, color correction, contrast correction, gamma correction, sharpness enhancement, or edge enhancement for example. The number N of video processing blocks and types of video processing performed by the N blocks may vary from embodiment to embodiment. The resulting processed video 1316 forms one of the outputs of video processor 1220.

Metadata decoder 1310 decodes the metadata 1214 received from the video source 1202 (also possibly by way of the video interface receiver that may be within intermediate device 1204). It is similar in its operation to the metadata decoder 916 of FIG. 9 in that it communicates relevant portions of the metadata to individual video processing functional blocks 1304, 1306 and 1308. For example, if the metadata 1314 indicates that the upstream video processor 1208 had applied de-interlacing and sharpness enhancement video processing and further indicates the specific procedure or adjustments that were performed to achieve that de-interlacing and sharpness enhancement, then the de-interlacing metadata would be communicated to a de-interlacing functional block and the sharpness enhancement information metadata would be communicated to a sharpness enhancement block (to the extent that such blocks exists in video processor 1220). This information is then used by those functional blocks to assist in determining the video processing to be applied to the video data 1212.

Metadata formatter 1312 is similar to the metadata formatter 814 of FIG. 8 in that it generates metadata representing the video processing that is currently being performed by the video processor of which it forms a part. The metadata typically indicates both the type(s) of video processing performed and the specific adjustments performed. However, metadata formatter 1312 goes further by combining the newly generated metadata with the metadata 1214 received from upstream video source 1202 to generate a composite set of metadata 1318 reflecting all of the video processing applied by either the upstream video processor 1210 or the instant (intermediate) processor 1220 (with the possible exception of any upstream video processing that has been overridden, as will be described). The composite metadata forms the other output of video processor 1220.

The processed video 1316 and composite metadata 1318 that are output by the video processor 1220 may be passed through a video interface transmitter (not illustrated) within intermediate device 1204 before being communicated to the video sink 1206.

Referring again to FIG. 12, the video sink device 1206 includes a video processor 1230. Like the video sink device 704 of FIG. 7, the video sink device 1206 may further contain other components, such as a video interface receiver for receiving data over the physical link with intermediate device 1204, but these are omitted for clarity. The video processor 1230 is similar to video processor 714 of FIG. 9, but its video processing capabilities are not necessarily limited to those of processor 714. The video processor 1230 receives processed video data 1316 (analogous to processed video data 710 of FIG. 9) and performs various processing upon the video data to improve the appearance or quality of the video images. The video processing may include any of the video processing of which either one of video processors 1208 or 1220 are capable, or other forms of video processing. As will be appreciated, the nature of the processing that is performed by video processor 1230 is determined, at least in part, by the metadata 1318. Because the metadata 1318 reflects the video processing performed at either one or both of the upstream video processors 1208 and 1220, the video processing performed at the video sink device 1206 is impacted not only by the video processing performed by the immediately upstream component 1204, but by all upstream components 1202, 1204. This approach may facilitate greater efficiency in the avoidance of previously applied video processing at video sink device 1206 or in performing video processing that achieves the best possible quality of video images at video sink device 1206 in view of the processing performed by multiple upstream components. After the processor 1230 applies its processing, the processed video data 1320 may be output to other components or for display.

Figure 14:
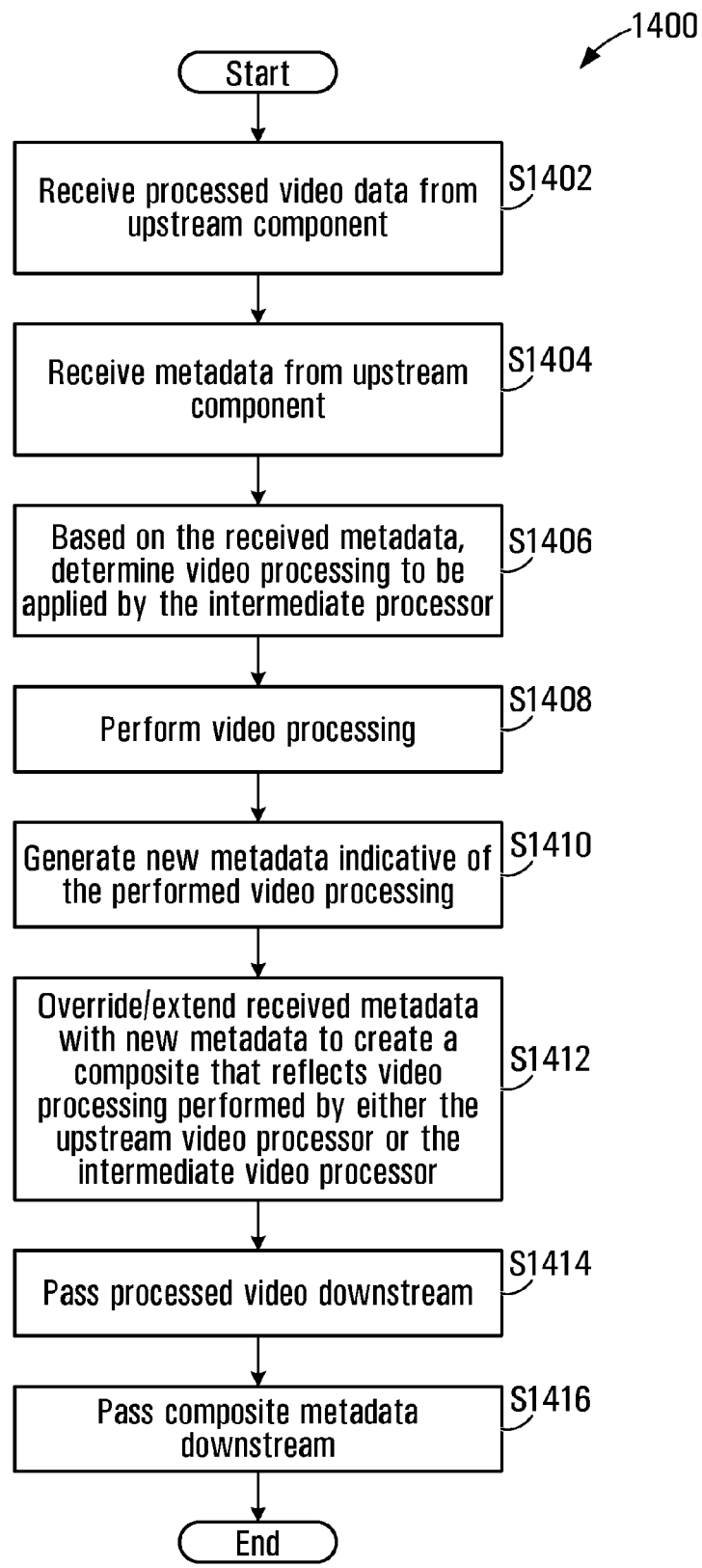
FIG. 14 is a flowchart illustrating operation of the video processor of FIG. 13.

Operation 1400 of the intermediate video processor 1220 (FIGS. 12, 13) of the present embodiment is illustrated in FIG. 14. Initially, video data 1212, to which at least some video processing has been applied by upstream video processor 1208, is received from video source 1202 (S1402), possibly by way of a video interface receiver within intermediate device 1204. The video data 1212 is stored in buffer 1300 (FIG. 13). Metadata 1214, which is indicative of the video processing that was performed, is also received (S1404) and is decoded by metadata decoder 1310. The format of the metadata 1214 may for example be any of: binary or textual; packetized; data structure; markup language; or compliant with ITU Recommendation ITU-BT.1364-1.

Metadata decoder 1310 communicates relevant portions of the metadata to individual functional blocks 1304, 1306 and/or 1308. This information is thereafter used by the functional blocks determine what further video processing, if any, should be applied to video data (S1406). For example, if the metadata indicates that color correction video processing has already been applied by the video processor 1208, then a color correction block of video processor 1220 may opt to perform other color correction processing, not performed by video processor 1208, that provides a further benefit, in terms of the quality of the resulting video images for example. The additional video processing that is performed may also be based partly upon user preferences or factory presets within intermediate device 1204.

As the functional block(s) 1304, 1306 and/or 1308 perform additional video processing to video data 1212 (S1408), new metadata regarding the additional video processing that is being performed is generated (S1410) by the relevant block(s) and is communicated to metadata formatter 1312. This newly generated metadata is combined with the earlier received metadata 1214 to generate a composite set of metadata 1318 reflecting all of the video processing applied by either the upstream video processor 1210 or the instant (intermediate) processor 1220 (S1412). In some cases the video processing performed by processor 1220 may override video processing performed upstream. In such cases combining the metadata may involve overriding (e.g. overwriting or replacing) at least some of the metadata 1214 with new metadata. It will be appreciated that the composite metadata 1318 in such cases may not actually reflect all of the video processing performed by either of video processor 1208 and 1220, but only the video processing whose effects have not been overridden. The omission of any metadata pertaining to overridden video processing may advantageously reduce the amount of metadata comprising composite metadata 1318. In other cases the video processing performed by processor 1220 may supplement video processing performed upstream. In such cases combining the metadata may involve adding new metadata to existing metadata 1214. The metadata formatter 1312 formats the resulting metadata 1318 into a suitable format to accompany the processed video data 1316. The format of metadata 1318 may be the same as the format of metadata 1214, for consistency, although this is not required. In some embodiments, the composite metadata 1318 may identify which component (video source 1202 or intermediate device 1204) performed each type of video processing that is indicated by the composite metadata 1318, possibly by way of unique product identifiers associated with these two components.

The processed video 1316 and composite metadata 1318 are thereafter passed downstream to the video sink device 1206 (S1414, S1416), possibly by way of a video interface transmitter. Advantageously, the video sink device 1206 is able to thereafter determine what further video processing, if any, to apply, based on not only information regarding video processing performed by the immediately upstream component (intermediate device 1204), but also by the video source 1202. Operation 1400 is thus concluded.

It will be appreciated that the term "video processor" in any of the above-described embodiments does not necessarily refer exclusively to a hardware component. That term could alternatively refer to a firmware component, software component (e.g. a software module or program), or combinations of these. In the case where the video processor is a software or firmware component, then the functional blocks capable of performing the various video processing operations may be sub-components (e.g. subroutines) of that component. Software or firmware may be loaded from or stored upon a machine-readable medium 815 (FIG. 8), 917 (FIG. 9) or 1313 (FIG. 13), which may be an optical disk, magnetic storage medium, or read-only memory chip for example, as appropriate. In some embodiments, the software may be loaded (e.g. into memory) and executed to cause hardware (e.g. one or more generic processors) to behave as described herein. Also, a video processor does not necessarily need to be a dedicated video processor. Rather, it may be a component that performs video processing in addition to other types of processing, that may be unrelated to video processing.

It should also be appreciated that the terms "upstream" and "downstream" as used herein are relative to the general direction of flow of video data through a system or between components.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method comprising, at an intermediate video processor:
   receiving video data;
   receiving metadata describing video processing that has been earlier performed upon said video data by an upstream video processor;
   determining at the intermediate video processor, from said received metadata describing video processing that has been earlier performed upon said video data by said upstream video processor, additional video processing to be performed upon said video data that has not yet been performed upon said video data;
   performing said determined additional video processing to create processed video data at the intermediate video processor; and
   forming composite metadata that describes the processed video data from said received metadata and new metadata describing the performed additional processing,
   passing said processed video data and composite metadata to a downstream video processor;
   wherein the composite metadata identifies, for each type of video processing indicated by the composite metadata, a video processing component that performed the type of video processing.

2. The method of claim 1 further comprising creating said composite metadata by adding said new metadata to said received metadata when said additional video processing supplements the earlier performed video processing.

3. The method of claim 1 further comprising creating said composite metadata by overriding at least a portion of said received metadata with said new metadata when said additional video processing overrides at least some of the earlier performed video processing.

4. The method of claim 3 wherein said overriding at least a portion of said received metadata comprises replacing said at least a portion of said received metadata.

5. A non-transitory machine-readable medium storing instructions that, when executed by a processor, cause said processor to:
   receive video data;
   receive metadata describing video processing that has been earlier performed upon said video data by an upstream video processor;
   determine at the processor, from said received metadata describing video processing that has been earlier performed upon said video data by said upstream video processor, additional video processing to be performed upon said video data that has not yet been performed upon said video data;

perform said determined additional video processing to create processed video data at the processor; and form composite metadata that describes the processed video data from said received metadata and new metadata describing the performed additional processing;

pass said processed video data and composite metadata to a downstream video processor;

wherein the composite metadata identifies, for each type of video processing indicated by the composite metadata, a video processing component that performed the type of video processing.

6. The machine-readable medium of claim 5 wherein said instructions further cause said processor to create said composite metadata by adding said new metadata to said received metadata when said additional video processing supplements the earlier performed video processing.

7. The machine-readable medium of claim 5 wherein said instructions further cause said processor to create said composite metadata by overriding at least a portion of said received metadata with said new metadata when said additional video processing overrides at least some of the earlier performed video processing.

8. The machine-readable medium of claim 7 wherein said overriding at least a portion of said received metadata comprises replacing said at least a portion of said received metadata.

9. An intermediate video processor comprising:
a buffer for receiving video data;
a metadata decoder for decoding received metadata describing video processing that has been earlier performed upon said video data by an upstream video processor;
at least one functional block for determining, at the intermediate video processor, additional video processing to be performed upon said video data that has not yet been performed upon said video data, said additional video processing being determined from said metadata describing video processing that has been earlier performed upon said video data by said upstream video processor and performing said determined additional video processing to result in processed video data at the intermediate video processor; and
a metadata formatter for forming composite metadata for passing to a downstream video processor along with said processed video data, said composite metadata describing the processed video data from said received metadata and new metadata indicative of the performed additional video processing,
said metadata formatter for passing said processed video data and composite metadata to a downstream video processor,
wherein said at least one functional block comprises at least one of a contrast correction functional block, gamma correction functional block, sharpness enhancement functional block, and edge enhancement functional block, and
wherein the composite metadata identifies, for each type of video processing indicated by the composite metadata, a video processing component that performed the type of video processing.

10. The intermediate video processor of claim 9 wherein said metadata formatter creates said composite metadata by overriding at least a portion of said received metadata with said new metadata when said additional video processing overrides at least some of the earlier performed video processing.

11. The intermediate video processor of claim 9 wherein composite metadata identifies each component by way of a unique product identifier.

* * * * *